United States Patent [19]
Rapeli

[11] Patent Number: 6,112,061
[45] Date of Patent: Aug. 29, 2000

[54] RADIO COMMUNICATION DEVICE

[75] Inventor: Juha Rapeli, Change, France

[73] Assignee: U.S. Philips Corporation, New York, N.Y.

[21] Appl. No.: 09/106,042

[22] Filed: Jun. 26, 1998

[30] Foreign Application Priority Data

Jun. 27, 1997 [EP] European Pat. Off. .............. 97401508

[51] Int. Cl.$^7$ ............................... H04B 1/44; H04B 1/46
[52] U.S. Cl. ................................................ 455/83; 455/82
[58] Field of Search .................. 455/83, 78, 82, 455/20, 22; 333/100, 101

[56] References Cited

U.S. PATENT DOCUMENTS

| | | | |
|---|---|---|---|
| 3,988,675 | 10/1976 | Dykas | ........................................ 455/78 |
| 4,853,972 | 8/1989 | Ueda et al. | ................................ 455/83 |
| 5,477,532 | 12/1995 | Hoshigami et al. | ....................... 455/82 |
| 5,723,912 | 3/1998 | Ahrabian et al. | ....................... 307/10.5 |
| 5,909,196 | 6/1999 | O'Neill, Jr. | .............................. 343/895 |

FOREIGN PATENT DOCUMENTS

0709911A2   1/1996   European Pat. Off. .......... H01P 1/12

OTHER PUBLICATIONS

By H.W. Tuttlebee "Cordless Telecommunications in Europe" Springer–Verlag London Ltd., 1990 pp. 213, 219 and 223.

By K. Hinohara et al., "Magnetic and Mechanical Design of Ultraminiature Reed Switches" IEEE Transactions on Components, Hybrids, and Manufacturing Technology, vol. 15, No. 2, Apr. 1992, pp. 172–176.

"ALEPH" Reed Relays of the US Company Ceejay, pp. 1–5.

*Primary Examiner*—Dwayne D. Bost
*Assistant Examiner*—Tracy M. Legree

[57] ABSTRACT

Known is a radio communication device such as a GSM handset with receive-transmit antenna switching means such as a duplexer or a transmit receive switch. In GSM handsets it is highly desirable to save battery power as much as possible. To this end in the receive and transmit paths, the power supplied to components is switched off when functioning of such components is presently not needed. Proposed is a radio communication device in which the receive-transmit switch is a couple of electromechanical switches, preferably ultra-miniature Reed relays, of which the actuating coils are connected in series with at least one DC-supplied circuit of the receive path or transmit path.

17 Claims, 4 Drawing Sheets

RADIO COMMUNICATION DEVICE

BACKGROUND OF THE INVENTION

1. Field of the Invention

The present invention relates to a radio communication device comprising a receive path having first rf-processing means, a transmit path having second rf-processing means, an antenna for receiving and transmitting a radio signal, a transmit-receive switching means coupled between the antenna and the receive and transmit path for switching the antenna to the receive path when the radio communication device is in a receive mode and for switching the antenna to the transmit path when the radio communication device is in a transmit mode, and power supply means for selectively supplying power to the first and second rf-processing means when the radio communication device is in the receive mode or in the transmit mode, respectively. Such a radio communication device can be a cellular or a cordless telephone, or any other suitable two way communication device. The radio device is arranged for alternately receiving or transmitting.

2. Description of the Related Art

A radio communication device of the above kind is known from the handbook "Cordless Telecommunications in Europe", H. W. Tuttlebee, pages 213, 219, and 223, Springer-Verlag London Ltd., 1990. At said pages various transceiver structures are disclosed with different implementations of coupling the antenna to the transmit path or to the receive path, when the transceiver is in transmit mode or in receive mode, respectively. In the transceivers described on page 213 and 219, antenna duplex filters are used for such an antenna coupling. In the transceiver described on page 223, a transmit-receive switch is used. In the latter transceiver actuating of the transmit-receive switch is only shown schematically. Usually such switches are electronic switches, although also costly coaxial transmission line based switches have been used. Using a duplex filter causes insertion losses in both the transmit and receive path. Due to such an insertion loss up to half or even more of the transmit power is lost in the filter, and the receiver sensitivity is degraded considerably. To compensate for such losses additional amplification is needed so that power consumption is increased. Furthermore, a good low loss duplex filter is a costly component. Use of an electronic switch, which is a non-linear element, causes undesired harmonic distortion. An electronic switch is also a lossy component with a limited operating voltage range. Given a desired rf-power, within such a limited voltage range, the current has to be higher so that there is an increased need for matching circuitry. Due to a higher current, there is an increased loss in printed circuit board wires. In practical cases, use of an electronic switch necessitates the use of a filter in the transmit path to limit transmit noise and harmonics generated in the switch. Also, a filter in the receive path is needed to obtain the necessary band selectivity. When applying a switch based solution, however, the requirements as to attenuation in the transmit band and power requirements are less demanding then applying a duplex filter based solution. So, after all, a switch based solution is beneficial. In modern lightweight communication devices, such as TDMA (Time Division Multiple Access) based digital cellular radio devices and cordless phones, it is highly desirable to reduce power consumption as much as possible because of the desire to have long standby and talk times. For this reason, circuitry in the receive and transmit path is switched off when not needed from a functional point of view. Also the rf front-end should be as linear as possible to that frequency spectrum requirements can be fulfilled more easily.

OBJECT AND SUMMARY OF THE INVENTION

It is an object of the present invention to provide a radio communication device with low power consumption and with good spectral specifications.

To this end the radio communication device according to the present invention is characterised in that transmit-receive switching means is an electromechanical switching means having at least one electromagnetic actuating means for actuating at least one switch comprised in the electromechanical switching means, the actuating means being connected in series with at least one DC-supplied circuit of the receive path or transmit path. Such an electromechanical switching means, preferably a ultra-miniature Reed switch, is highly linear. Furthermore, the voltage range is much higher then for an electronic switch. Because the actuating means of such an electromechanical switch are connected in series with the power supply of components in the receive or transmit path, or deploy the transient energy only, no additional current consumption occurs, and hence power consumption is low. This is based upon the insight that no additional current for excitation of the electromagnetic actuating means, usually a coil, is needed.

Preferably, a change-over switch is applied so as to save PCB-space. Further, acceleration of switching off is provided so that the device advantageously has a faster switching over response from transmit to receive mode. The switch is preferably an ultra-miniature Reed switch. Such switches can be used advantageously in miniature and high density electronic equipment. For a more detailed description of ultra-miniature Reed switches, referred is to an article "Magnetic and Mechanical Design of Ultraminiature Reed Switches", K. Hinohara et al., IEEE Transactions on Components, Hybrids, and Manufacturing Technology, Vol. 15, No. 2, April 1992, pp. 172–176. At present rf-ultra compacts reed relays are readily available onto market, such as ALEPH™ Reed Relays of the US company Ceelay. Double functioning of the electromagnetic actuating means is also provided. The excitation coil of the electromechanical switch can be used in an rf-filter or in a voltage doubler, for instance. This has the great advantage that components are saved so that costs are reduced, and at the same time PCB space. Saving PCB space is important when miniaturising the radio communication device.

BRIEF DESCRIPTION OF THE DRAWING

The present invention will now be described, by way of example, with reference to the accompanying drawings, wherein FIG. 1 schematically shows a block diagram of a radio communication device, with a first embodiment of a transmit-receive switching means according to the present invention.

DESCRIPTION OF THE PREFERRED EMBODIMENT

Figure 1:
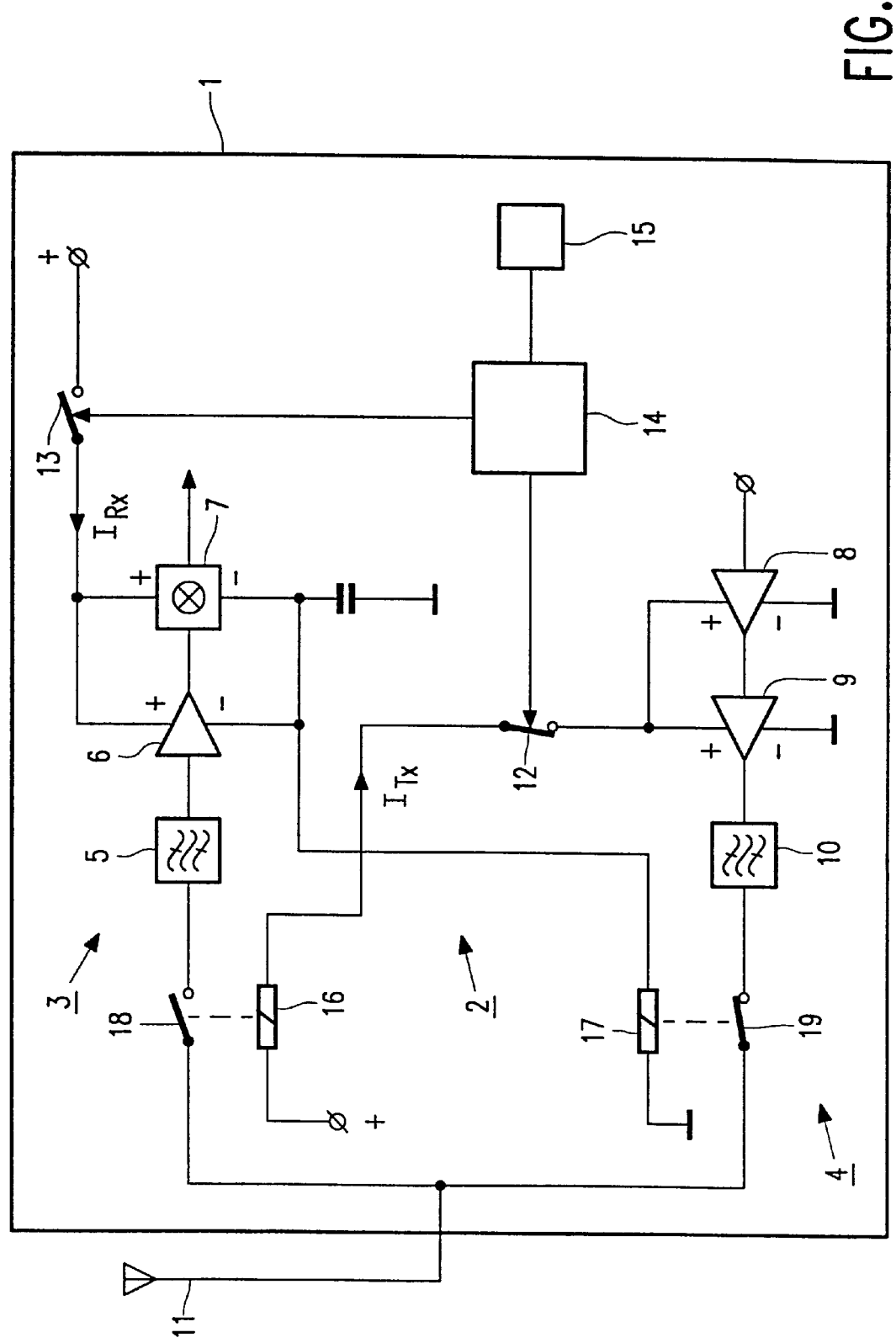

FIG. 1 schematically shows a block diagram of a radio communication device 1, with a first embodiment of a transmit-receive switching means 2 according to the present invention. The radio communication device 1 comprises a receive path 3 and a transmit path 4. The receive path 3 comprises first rf-processing means including a receive filter 5 which is coupled to a rf-amplifier 6. An output of the rf-amplifier 6 is fed to a mixer 7. The transmit path 4 comprises second rf-processing means including power amplifier stages 8 and 9 coupled to a transmit filter 10. The radio communication device 1 further comprises an antenna 11 for receiving or transmitting a radio signal. The transmit-receive switching means 2 are coupled between the antenna 11 and the receive and transmit paths 3 and 4. When the radio communication device 1 is in receive mode, the antenna 11 is switched to the receive path 3. When the radio communication device 1 is in transmit mode, the antenna 11 is switched to the transmit path 4. Power supply means, e.g. in the form of a battery (not shown) selectively supplies power to the first and second rf-processing means, when the radio communication device 1 is in the receive mode or in the transmit mode, respectively. To this end switching means are provided, schematically shown as switches 12 and 13 and control logic 14 controlled by a programmed microcontroller 15 having a ROM and RAM memory. The switches 12 and 13 usually are electronic switches. The microcontroller 15 is programmed such that the receiver can be put in the receive mode or in the transmit mode. According to the present invention, the current paths switched by the switches 12 and 13 are connected in series with respective electromagnetic actuating means 16 and 17 for actuating antenna switches 18 and 19 in the receive path 3 and the transmit path 4, respectively. The electromagnetic actuating means 16 and 17 form electromechanical switching means with the antenna switches 18 and 19, respectively, preferably in the form of ultra-miniature Reed relays or switches suitable for radio frequencies up to the multiple GHz range. In the embodiment given, the supply current $I_{TX}$, flowing when the transmit path 4 is activated, actuates the relay coil 16, and the supply current $I_{RX}$, flowing when the receive path 3 is activated, actuates the relay coil 17. Such a logic could be called inverted logic. In FIG. 1, the switches 18 and 19 are normally-on switches, i.e., are closed switches when no current flows through the actuating means 16 and 17 and are open switches when an adequate current flows through the actuating means 16 and 17.

Figure 2:
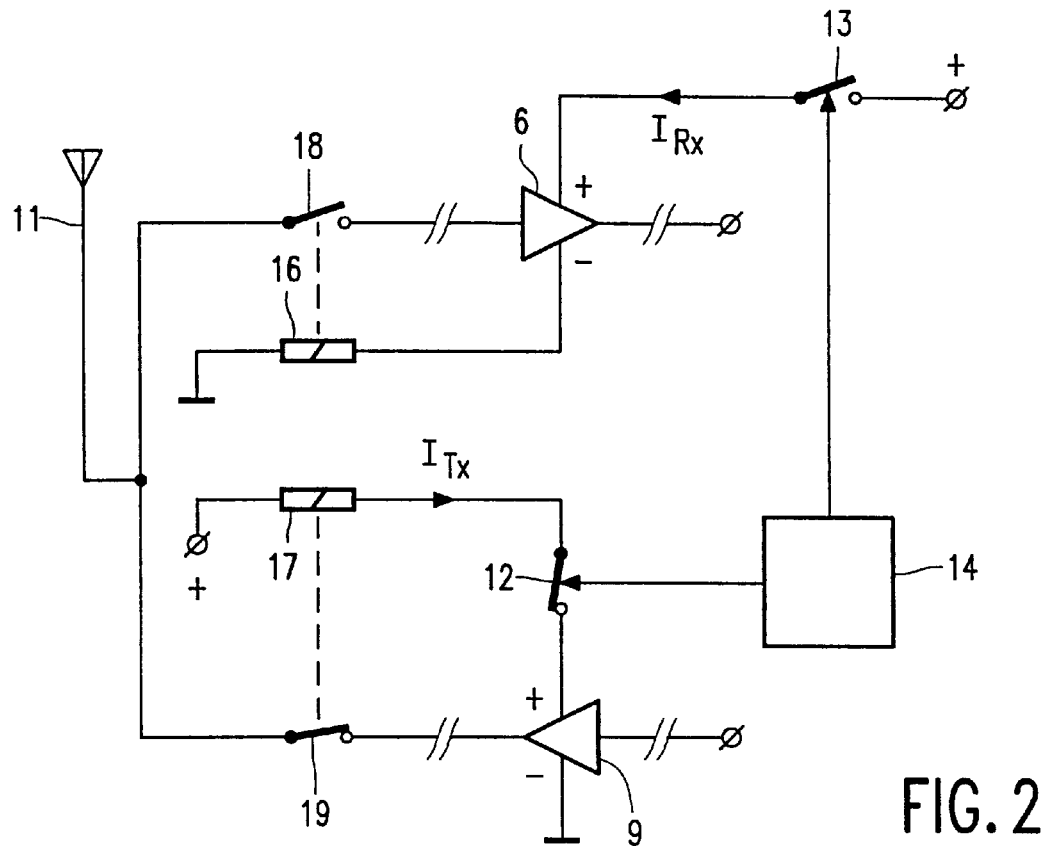
FIG. 2 shows a second embodiment of a transmit-receive switching means according to the present invention.

FIG. 2 shows a second embodiment of a transmit-receive switching means according to the present invention. In this embodiment so-called direct logic is applied. The receive supply current $I_{RX}$ controls the relay coil 16, and the transmit supply current $I_{TX}$ controls the relay coil 17. The switches 18 and 19 are both of the normally-off type, i.e., are open when not activated.

Figure 3:
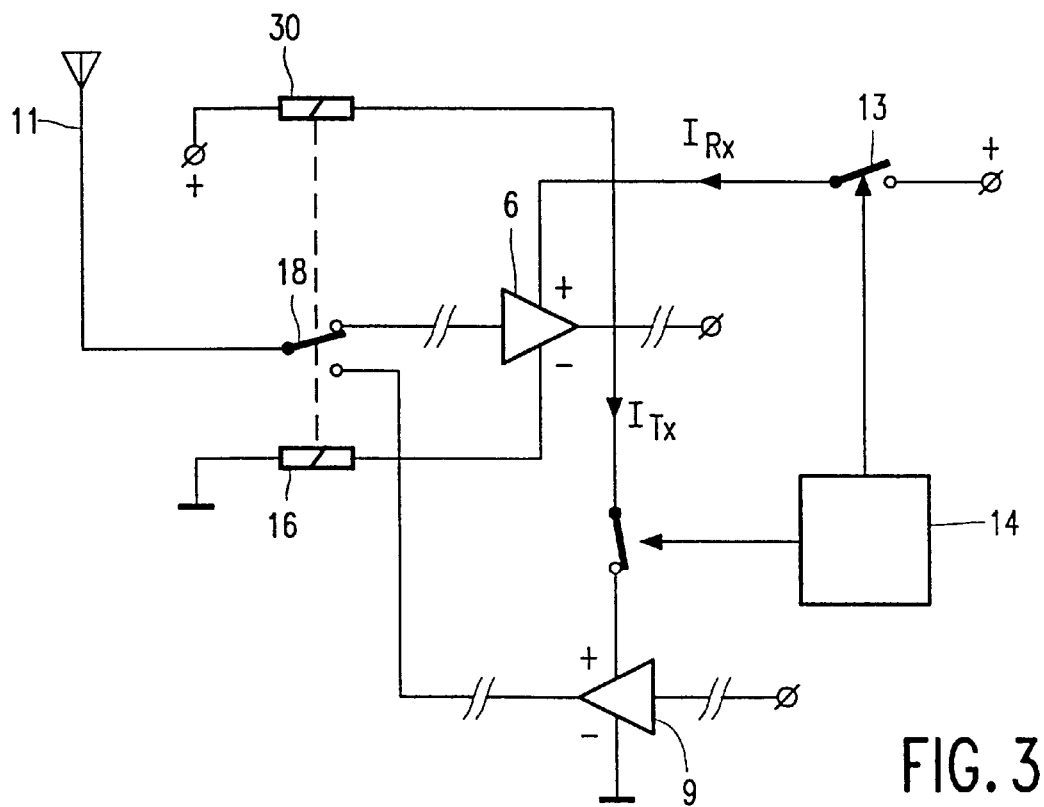
FIG. 3 shows a third embodiment of a transmit-receive switching means according to the present invention.

FIG. 3 shows a third embodiment of a transmit-receive switching means according to the present invention in which direct logic is applied for controlling the receive and transmit switches. In the embodiment given, the receive switch 18 is a change-over switch combining the functions of receive and transmit switch. The switch 18 has a non-activated position as shown. For acceleration of the switch to switch to the non-activated position, a spring loaded position, an accelaration coil 30 is provided accelerating movement of the switching contacts to return to the non-activated position and herewith to the receive position. The influence of the acceleration coil 30 is opposite to the influence of the actuating means.

Figure 4:
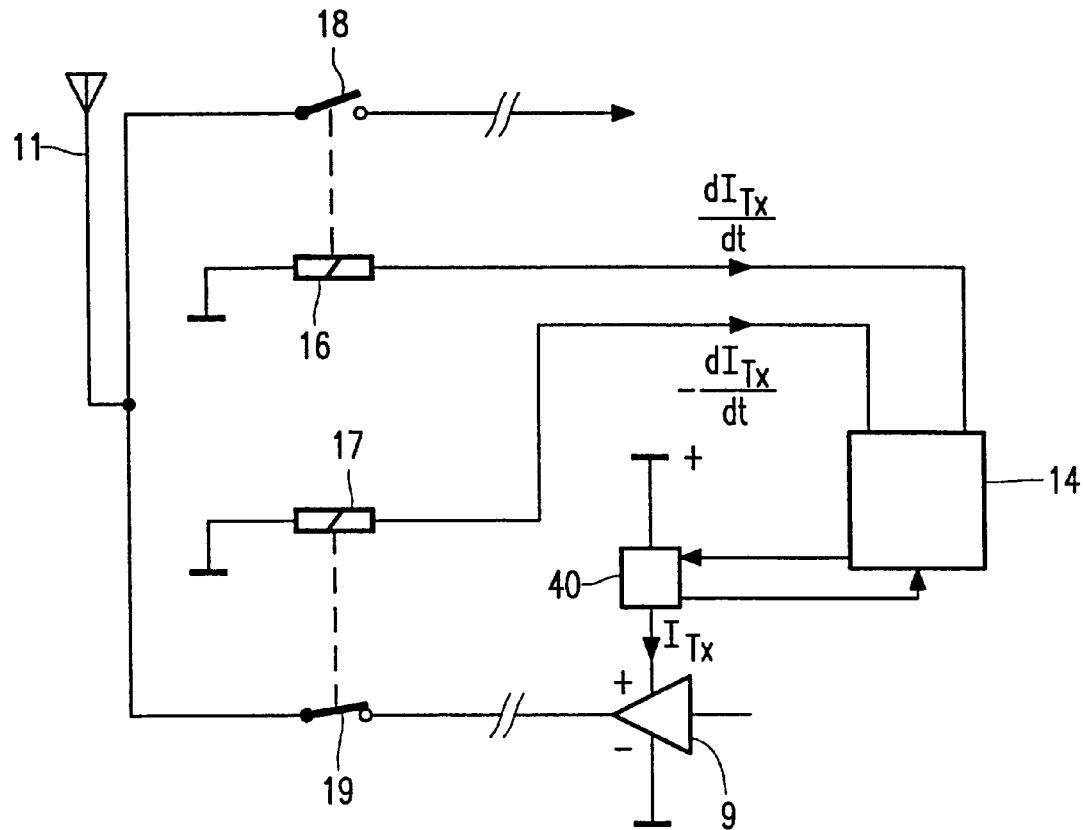
FIG. 4 shows a third embodiment of a transmit-receive switching means according to the present invention.

FIG. 4 shows a third embodiment of a transmit-receive switching means according to the present invention. In this embodiment, in which also direct logic is applied, the switches 16 and 17 are toggled, i.e., switched between on/off states, by means of signals $dI_{TX}/dt$ and $-dI_{TX}/dt$ derived from the transmit supply current $I_{TX}$ when being ramped-up or ramped-down, respectively. Herewith control of the actuating means 16 and 17 of the switches 18 and 19 is done by current pulses. Such current pulses can be generated by RC-circuits, well-known as such. Herewith it is no more necessary that the current, e.g. the transmit current $I_{TX}$, flows through the actuating means 16 and 17. Ramping-up and ramping-down occurs is GSM handsets, for instance, to switch on or off the rf-power output of the transmitter at a predetermined rate rather than an abrupt switching to and from full power, so as to avoid undesired spectrum broadening when controlling the transmit power supply. In FIG. 4, ramping up/down circuitry 40 is shown, well-known in GSM handsets.

Figure 5:
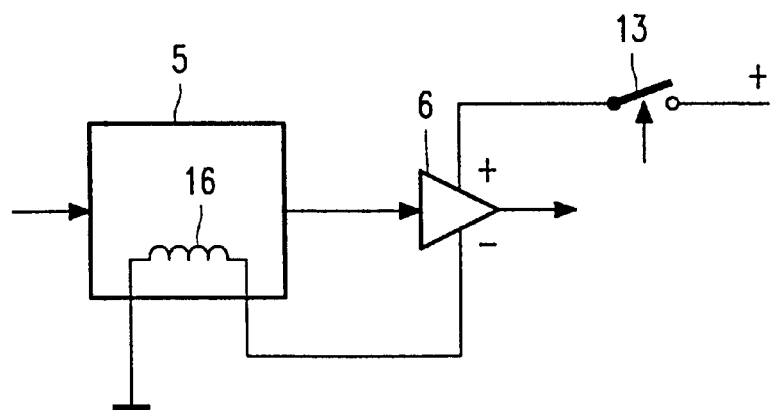
FIG. 5 shows combined functionality of the transmit-receive switching means with other functions in the radio communication device.

FIG. 5 shows combined functionality of the transmit-receive switching means with other functions in the radio communication device. In this embodiment, the relay coil 16 of the Reed switch, formed by the relay coil 16 and the switching contact 18, is also used in the receive filter 5 as an inductive filtering element. Such a combined use saves a component and herewith PCB space. Combined use of the relay coil 16 can also be made by also using the relay coil 16 in a transmit pulse voltage doubler used in the radio communication device 1. The relay coil 16 can also be used to implement other functionality where an inductive element is needed.

Figure 6:
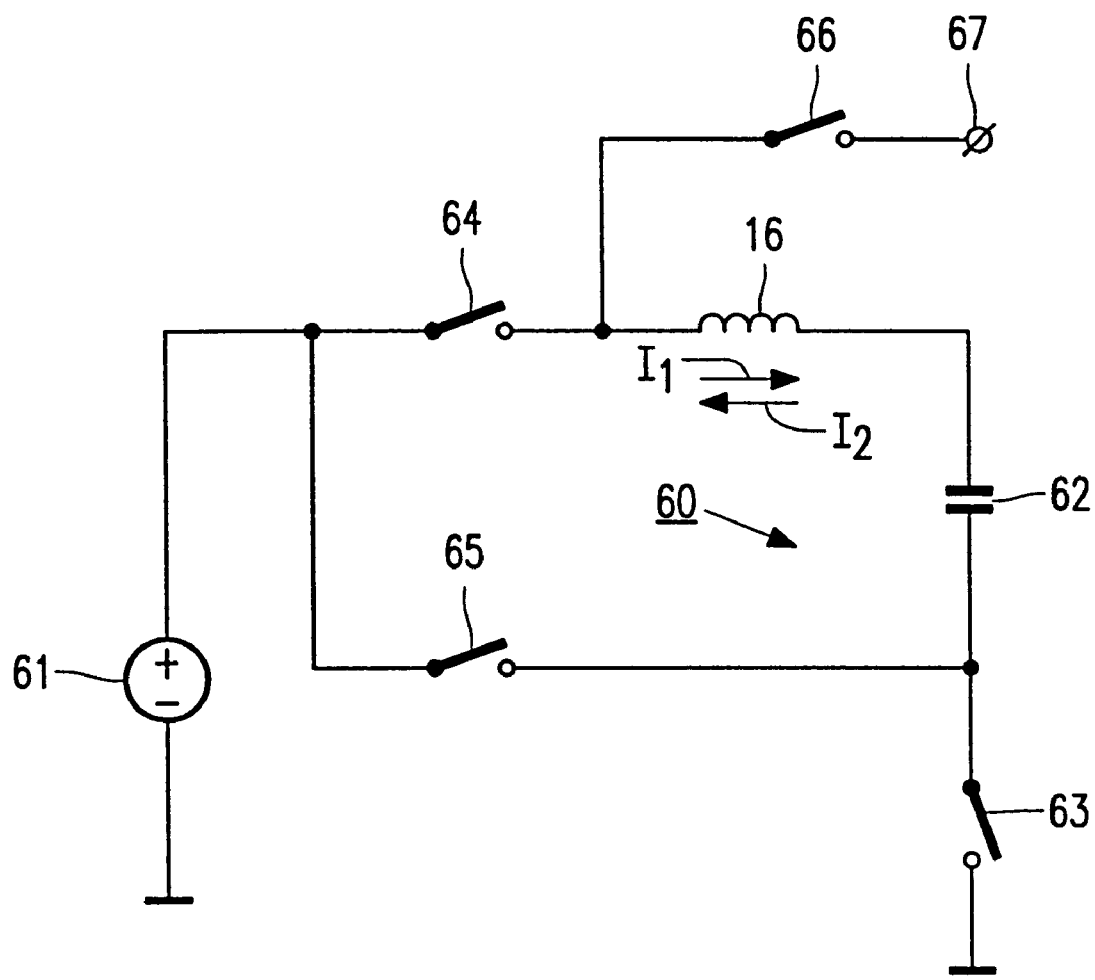
FIG. 6 shows combined functionality of the transmit-receive switching means with a voltage doubler.

FIG. 6 shows combined functionality of the transmit-receive switching means with a voltage doubler 60. The relay coil 16 of the Reed switch, formed by the coil 16 and the switching contact 18, is also used as an inductive element in the voltage doubler 60. To this end, a battery 61 is coupled to a capacitor 62 via the coil 16. The capacitor 62 is charged by the battery 61 so that switching transient loss is absorbed. Switches 63 and 64 are closed when the radio device is not transmitting, for instance. As a result, a current $I_1$, is flowing through the coil 16. When the radio device is set in the transmit mode, switches 65 and 66 are closed so that the battery 61 and the voltage across the coil 16 are switched in series. Herewith, a voltage doubling function is realized, twice the battery voltage being available at an output terminal 67. Then, a current $I_2$ flows through a load (not shown).

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A radio communication device comprising a receive path having first rf-processing means, a transmit path having second rf-processing means, an antenna for receiving and transmitting a radio signal, a transmit-receive switching means coupled between the antenna and the receive and transmit path for switching the antenna to the receive path when the radio communication device is in a receive mode and for switching the antenna to the transmit path when the radio communication device is in a transmit mode, and power supply means for selectively supplying power to the first and second rf-processing means when the radio communication device is in the receive mode or in the transmit mode, respectively, characterised in that transmit-receive switching means is an electromechanical switching means having at least one electromagnetic actuating means for actuating at least one switch comprised in the electromechanical switching means, the actuating means being connected in series with at least one DC-supplied circuit of the receive path or transmit path.

2. A radio communication device as claimed in claim 1, having separate electromagnetic actuating means for the transmit and receive path, which are energised by a transmit path supply current so as to switch the antenna to the transmit path, and by a receive path supply current so as to switch the antenna to the receive path, respectively.

3. A radio communication device as claimed in claim 2, wherein the at least one switch is formed by separate switches for the receive and transmit paths.

4. A radio communication device as claimed in claim 2, wherein the at least one switch is a change-over switch.

5. A radio communication device as claimed in claim 1, having separate electromagnetic actuating means for the transmit and receive path, which are energised by the transmit path supply current so as to switch off the antenna from the receive path, and by the receive path supply current so as to switch off the antenna from the transmit path, respectively.

6. A radio communication device as claimed in claim 5, wherein the at least one switch is formed by separate switches for the receive and transmit paths.

7. A radio communication device as claimed in claim 5, wherein the at least one switch is a change-over switch.

8. A radio communication device as claimed in claim 1, wherein the switch is a toggle switch and the actuating means are controlled by a derivative of the transmit or receive path supply current.

9. A radio communication device as claimed in claim 8, wherein the at least one switch is formed by separate switches for the receive and transmit paths.

10. A radio communication device as claimed in claim 8, wherein the at least one switch is a change-over switch.

11. A radio communication device as claimed in claim 1, wherein the at least one switch is formed by separate switches for the receive and transmit paths.

12. A radio communication device as claimed in claim 1, wherein the at least one switch is a change-over switch.

13. A radio communication device as claimed in claim 1, wherein the at least one switch is constructed such that the switch returns to a predetermined switching state due to a magnetical or mechanical force when the corresponding actuating means is de-energised, and wherein returning of the switch to the predetermined switching state is accelerated by another actuating means energised by the receive path or transmit path causing an additional force for the switch to return to the predetermined state.

14. A radio communication device as claimed in claim 1, wherein the at least one switch is an ultra-miniature Reed switch.

15. A radio communication device as claimed in claim 1, wherein the electro-magnetic actuating means is additionally used for another function in the radio communication device.

16. A radio communication device as claimed in claim 15, wherein the other function is rf-filtering, whereby the electromagnetic actuating means is comprised in an rf-filter.

17. A radio communication device as claimed in claim 15, wherein the other function is voltage doubling, whereby the electromagnetic actuating means in comprised in a voltage doubler.

* * * * *